(12) United States Patent
Suzuki

(10) Patent No.: US 11,312,152 B2
(45) Date of Patent: Apr. 26, 2022

(54) LIQUID FLOW-PATH MEMBER, AND MANUFACTURING METHOD FOR LIQUID FLOW-PATH MEMBER

(71) Applicant: SEIKO EPSON CORPORATION, Tokyo (JP)

(72) Inventor: Wataru Suzuki, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/110,510

(22) Filed: Dec. 3, 2020

(65) Prior Publication Data

US 2021/0170761 A1    Jun. 10, 2021

(30) Foreign Application Priority Data

Dec. 6, 2019    (JP) .............................. JP2019-221005

(51) Int. Cl.
    *B29C 65/16*      (2006.01)
    *B41J 2/185*      (2006.01)
    *B29L 31/00*     (2006.01)

(52) U.S. Cl.
    CPC ........... *B41J 2/185* (2013.01); *B29C 65/1635* (2013.01); *B29C 65/1677* (2013.01); *B29L 2031/767* (2013.01)

(58) Field of Classification Search
    CPC .......................... B41J 2/185; B29L 2031/767; B29C 65/1677; B29C 65/1635
    See application file for complete search history.

(56) References Cited

U.S. PATENT DOCUMENTS

2018/0079213 A1    3/2018   Hanagami et al.

FOREIGN PATENT DOCUMENTS

JP     2018-047599 A    3/2018

*Primary Examiner* — Daniel McNally
(74) *Attorney, Agent, or Firm* — Workman Nydegger

(57) ABSTRACT

A manufacturing method for a liquid flow-path member including a flow path between a first substrate and a second substrate layered together, the method including a welding step for welding the first substrate and the second substrate together, in which in the method, the first substrate is formed of a material that blocks ultraviolet light and absorbs laser light, the second substrate is formed of a material that blocks ultraviolet light and transmits laser light, and in which the welding step includes melting, with laser light passing through the second member, a joint surface where the first member and the second member are joined to weld the first member and the second member together.

2 Claims, 4 Drawing Sheets

LIQUID FLOW-PATH MEMBER, AND MANUFACTURING METHOD FOR LIQUID FLOW-PATH MEMBER

The present application is based on, and claims priority from JP Application Serial Number 2019-221005, filed Dec. 6, 2019, the disclosure of which is hereby incorporated by reference herein in its entirety.

BACKGROUND

1. Technical Field

The present disclosure relates to a liquid flow-path member and a manufacturing method for the liquid flow-path member.

2. Related Art

There is disclosed, in JP 2018-47599 A, a liquid flow-path member in which a flow path is formed between a first member and a second member that are layered together as a liquid flow-path member that partially constitutes a liquid supply channel from a liquid reservoir to a liquid discharge head, in an apparatus, such as an inkjet printer, equipped with a liquid discharge head. Further, as a manufacturing method for the liquid flow-path member, a method by laser welding is described in which the second member is formed of a light-transmissive resin and the first member is formed of a light-absorbing resin, and the first member is melted by laser light passing through the second member to weld the first member and the second member together. According to the manufacturing method, the laser light passing through the second member is used to directly melt a joint surface of the first member to perform welding, thus, the second member, by being configured by a member having a high transmittance of laser light, can increase a thickness of the second member to configure a flow path having high robustness, compared to when allowing the second member to be welded to the first member by thermocompression bonding, for example.

Unfortunately, there is an issue in that the liquid flow-path member described in JP 2018-47599 A is not adaptive to a flow-path for flowing an ultraviolet light-curing type liquid when the second member of a light-transmissive type is also transmissive of ultraviolet light.

SUMMARY

A manufacturing method for the liquid flow-path member is a manufacturing method for a liquid flow-path member including a flow path between a first member and a second member that are layered together, the method including a welding step for welding the first member and the second member together, in which the first member is formed of a material that blocks ultraviolet light and absorbs laser light, and the second member is formed of a material that blocks ultraviolet light and transmits laser light, and in which the welding step includes melting, with laser light passing through the second member, a joint surface where the first member and the second member are joined to weld the first member and the second member together.

The liquid flow-path member includes a first member and a second member, the second member being layered at the first member with a flow path formed between the second member and the first member, in which the first member is formed of a material that blocks ultraviolet light and absorbs laser light, and the second member is formed of a material that blocks ultraviolet light and transmits laser light and visible light.

DESCRIPTION OF EXEMPLARY EMBODIMENTS

Figure 1:
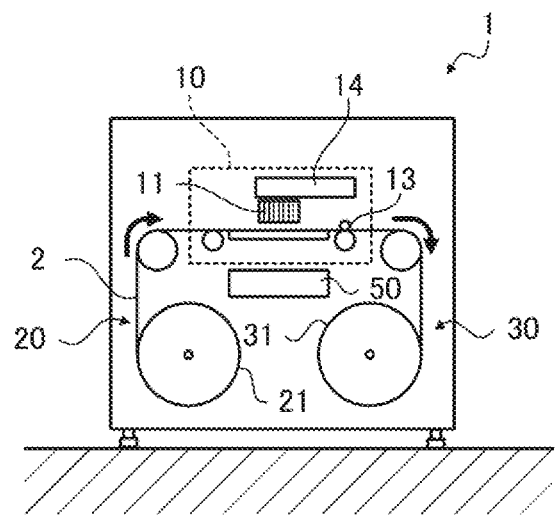
FIG. 1 is a front view schematically illustrating an inkjet printer having an ink supply unit including an ink branch flow-path member as a liquid flow-path member according to an embodiment.

First, an inkjet printer 1 provided with a liquid flow-path member according to the embodiment will be described below with reference to FIGS. 1 and 2. The liquid flow-path member is provided at an ink supply unit 14 included in the inkjet printer 1 such as that illustrated in FIG. 1, for example.

The inkjet printer 1 is an inkjet-type printer configured to discharge ink as a liquid to print an image on a printing medium 2 supplied in a state of being wound in a rolled form. The inkjet printer 1 is constituted by a printing unit 10, a supply unit 20, a storage unit 30, and a control unit 50, and the like.

The printing unit 10 is a unit configured to form an image on the printing medium 2 in accordance with a control signal based on image information to be printed, from the control unit 50. The printing unit 10 includes a discharge head 11, a driving roller 13, the ink supply unit 14, and the like.

The discharge head 11 is a line head configured by aligning, across a width direction of the printing medium 2, a plurality of discharge head units 11u having several hundreds of nozzles 111 for discharging ink. The discharge head 11 is provided in eight pieces corresponding to eight colors of cyan, magenta, yellow, black, light cyan, light magenta, light yellow, and light black, as types of ink to be discharged, for example.

The respective discharge heads 11 discharge ink droplets from the nozzles 111, under a control of the control unit 50, to form a desired image on the printing medium 2 being transported by the driving roller 13 driven under the control of the control unit 50.

The ink supply unit 14 is a mechanism configured to supply ink to be discharged, while circulating the ink, to each of a plurality of the discharge heads 11. The ink supply unit 14 is constituted by an ink tank 61, an ink circulation path 63, a pump 64, and the like, as illustrated in FIG. 2.

Figure 2:
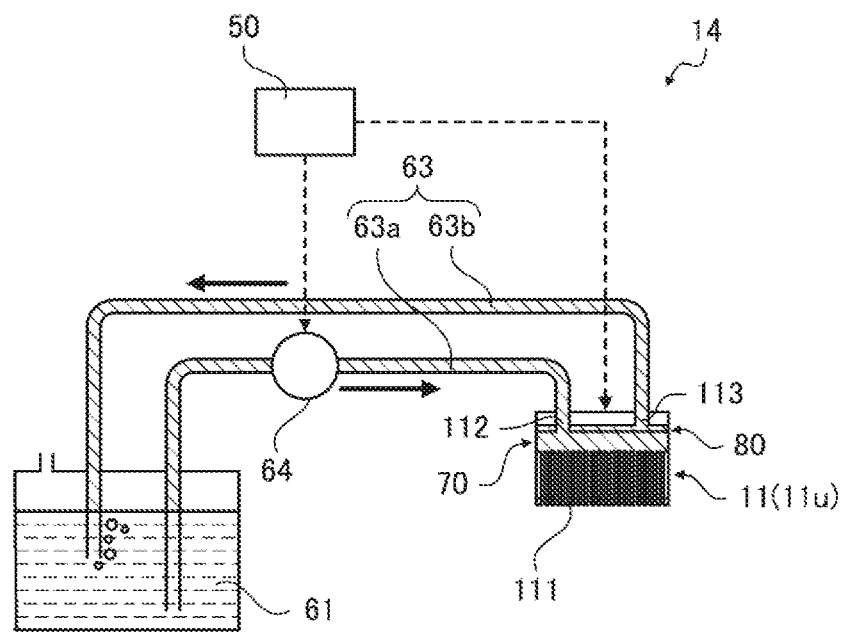
FIG. 2 is a view schematically illustrating a configuration of an ink supply unit.

Note that FIG. 2 illustrates components of the ink supply unit 14 corresponding to one piece of the discharge head 11 among the discharge heads 11 provided for each of the types of a plurality of the inks to be discharged. The components such as the ink tank 61, the ink circulation path 63, the pump 64, and the like are provided independently for each of the types of the ink to be supplied.

The ink circulation path 63 includes a forward path 63*a* from the ink tank 61 to an ink introduction port 112 of the discharge head 11 and a return path 63*b* from an ink derivation port 113 of the discharge head 11 to the ink tank 61. The ink circulation path 63 further includes, inside the discharge head 11, an ink branch flow-path member 70, an ink collection flow-path member 80, and the like that are provided between the ink introduction port 112 and the ink derivation port 113.

The ink circulation path 63 is configured, by the drive of the pump 64 provided at the forward path 63*a*, to circulate the ink between the ink tank 61 and the discharge head 11.

The ink tank 61 can retain the ink inside the ink tank 61, and is configured to deliver the retained ink to the forward path 63*a* and to receive. from the return path 63*b*, the ink flowing back from the discharge head 11.

The supply unit 20, which is a unit configured to store and send out the printing medium 2 to be printed, includes a feeding-out reel 21 located upstream of the printing unit 10 in a transport path of the printing medium 2 to load the printing medium 2.

The storage unit 30, which is a unit configured to wind and store the printing medium 2 having been printed, includes a winding reel 31 located downstream of the printing unit 10 in the transport path of the printing medium 2 to wind the printing medium 2.

The control unit 50 includes a CPU, a memory, an interface for connecting to external electronic apparatuses, a drive circuit configured to drive the printing unit 10, the supply unit 20, the storage unit 30, and the like. The control unit 50 is configured, based on image data received from the external electronic apparatuses and information specifying the printing specification, to control the printing unit 10, the supply unit 20, the storage unit 30, and the like, to form a desired printed image on the printing medium 2 to create a printed material.

Note that as the printing medium, the printing medium 2 supplied in a state of being wound in a rolled form has been described as an example, and the printing medium 2 may also be a printing medium of a single sheet. When handling a printing medium of a single sheet as a target, the supply unit includes a supply mechanism including a separator for supplying the printing medium one by one to the printing unit 10. In addition, the storage unit includes a storage tray or the like for storing the printing medium ejected from the printing unit 10 after the printing has been performed.

Further, the discharge head 11 may also be a serial head mounted on a movable carriage and configured to discharge ink while moving in the width direction of the printing medium 2.

The ink circulation path 63 described above is configured to include a tube that constitutes a flow path of the ink, and a liquid flow-path member produced by a manufacturing method for a liquid flow-path member of the present application.

Hereinafter, with reference to FIGS. 3 to 6, the ink branch flow-path member 70 and the ink collection flow-path member 80 will be described, which are practical examples of the liquid flow-path member of the present application.

Figure 3:
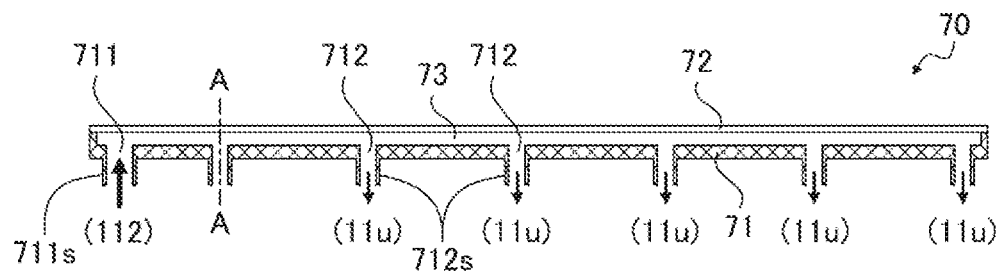
FIG. 3 is a cross-sectional view illustrating a configuration of an ink branch flow-path member as a practical example of a liquid flow-path member.

The ink branch flow-path member 70 is, in the discharge head 11, a flow-path member for supplying, as branch currents, the ink supplied from the ink introduction port 112 to each of the plurality of discharge head units 11*u* that constitute the discharge head 11. FIG. 3 illustrates an example of branching into six pieces of the discharge head units 11*u*.

Figure 4:
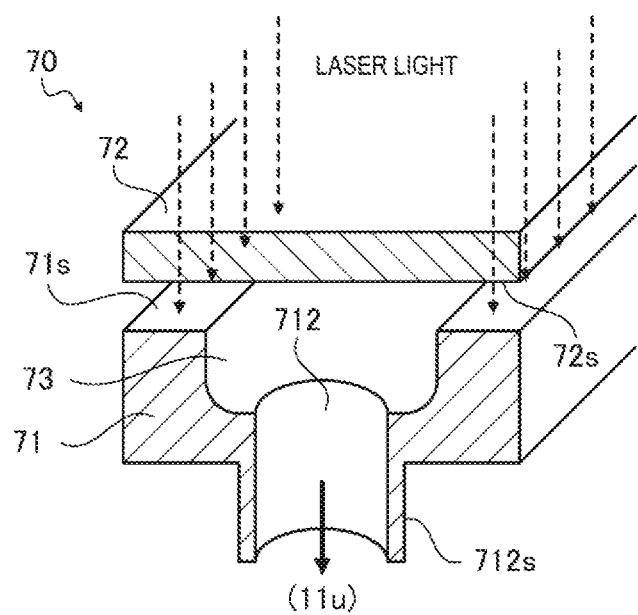
FIG. 4 is a perspective view illustrating a cross section A-A in FIG. 3.

The ink branch flow-path member 70 is constituted by a first substrate 71 as a first member, a second substrate 72 as a second member that is layered on and welded to the first substrate 71, and the like. Note that FIG. 4 illustrates a state before the first substrate 71 is welded to the second substrate 72.

The first substrate 71 is a substantially rectangular parallelepiped substrate extending in a flow-path direction in which the ink flows, specifically, a direction in which the discharge head units 11*u* are aligned, where a groove is formed along the extending direction at the center of the surface facing the second substrate 72.

The second substrate 72 is layered on the first substrate 71 to cover the groove formed at the first substrate 71, to form a flow path 73 that allows the ink to flow between the second substrate 72 and the first substrate 71. Note that both ends in the extending direction of the groove formed at the first substrate 71 fail to reach both ends of the first substrate 71. That is, the flow path 73 is closed, at the both ends in the extending direction, by side walls of the first substrate 71, as illustrated in FIG. 3.

The first substrate 71 is formed of a material that blocks ultraviolet light and absorbs laser light. Specifically, polypropylene resin containing carbon black particles is used to form the first substrate 71, as a preferred example.

The second substrate 72 is formed of a material that blocks ultraviolet light and transmits laser light and visible light. Specifically, thermoplastic polyimide resin that blocks ultraviolet light and transmits laser light and visible light is used to form the second substrate 72, as a preferred example.

Figure 5:
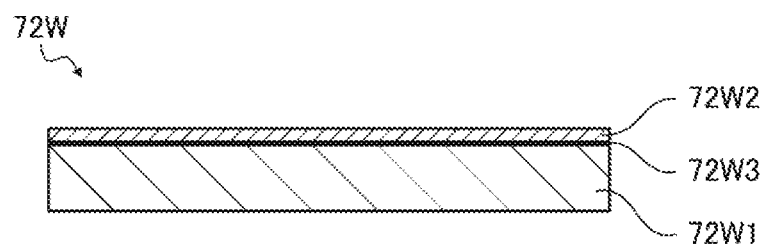
FIG. 5 is a cross-sectional view illustrating an example of a configuration of a second substrate as a second member.

Note that the second substrate 72 may be constituted, rather than constituted by a single material such as the thermoplastic polyimide resin, by layering a plurality of materials together, like a second substrate 72W illustrated in FIG. 5. The second substrate 72W is constituted by bonding, via an adhesive layer 72W3 that transmits laser light and visible light, a polypropylene resin layer 72W1 having transparency, that is, transmissive of laser light and visible light, which is weldable to the first substrate 71, and a polyimide film 72W2 that blocks ultraviolet light and transmits laser light and visible light. That is, the second member is configured to include an ultraviolet light-blocking film using polyimide.

Here, the phrase "blocking ultraviolet light" refers specifically to a case of blocking light having a wavelength from 200 nm to 350 nm.

Note that when the ink passing through the flow path 73 is ultraviolet light-curing type ink, and of which a wavelength region of ultraviolet light that proceeds a curing reaction is, according to the curing properties of the ink, a wavelength region having a width narrower than a wavelength region ranging from 200 nm to 350 nm, it is sufficient for the second substrate 72 to block light in the narrower wavelength region and to transmit laser light and visible light.

In addition, as illustrated in FIG. 3, a plurality of ink passage ports are provided, which pass through the first substrate 71 to an opposite side to a side on which the second substrate 72 is layered, at the groove formed at the first substrate 71 that constitute the flow path 73. Further, each of the ink passage ports is provided with a sleeve that communicates with the flow path 73 and enables a connection with another flow-path member or a tube coupled to the ink branch flow-path member 70. Specifically, one end region of the first substrate 71 is provided with an ink passage port 711 and a sleeve 711s that communicate with the ink introduction port 112 and through which the ink flowing in from the ink introduction port 112 passes, where a region from the one end region toward the other end region of the first substrate 71 is provided, at substantially equal intervals in accordance with positions at which the discharge head units 11u are aligned, with ink passage ports 712 and sleeves 712s through which the ink flowing out toward the respective discharge head units 11u passes.

The ink branch flow-path member 70 thus configured allows the ink flowing in from the ink tank 61 to the ink introduction port 112 to be delivered, as branch currents, to the respective discharge head units 11u. Note that, for ease of explanation, the flow path 73 is described to have a shape that the groove extending in the extending direction of the first substrate 71 is covered by the second substrate 72, however, it is preferred for the flow path 73 to be configured to have a length and shape such that the flow-path resistances from the ink passage port 711 to the respective ink passage ports 712 are equal to one another.

Figure 6:
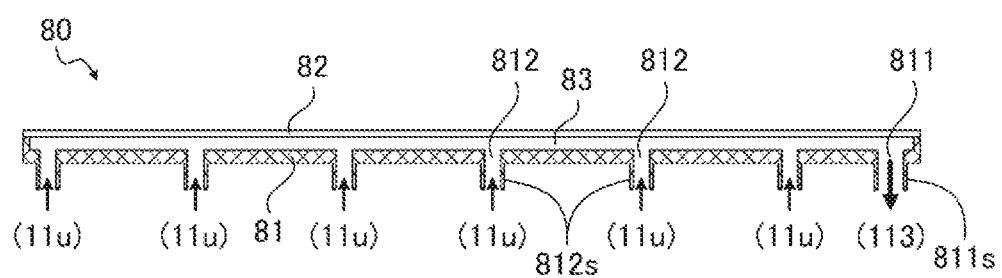
FIG. 6 is a cross-sectional view illustrating a configuration of an ink collection flow-path member as a practical example of a liquid flow-path member.

The ink collection flow-path member 80 has substantially the same configuration as the ink branch flow-path member 70, as illustrated in FIG. 6.

The ink collection flow-path member 80 is, in the discharge head 11, a flow-path member for collecting the ink flowing back from each of the plurality of discharge head units 11u that constitute the discharge head 11 into the ink derivation port 113.

The ink collection flow-path member 80 is constituted by a first substrate 81 as the first member, a second substrate 82 as the second member that is layered on and welded to the first substrate 81, and the like. The second substrate 82 covers the groove formed at the first substrate 81 to form a flow path 83 that allows the ink to flow between the second substrate 82 and the first substrate 81. The flow path 83 is closed, at both ends in the extending direction of the ink collection flow-path member 80, by side walls of the first substrate 81, as illustrated in FIG. 6.

The first substrate 81 is formed of the same material as the first substrate 71, and the second substrate 82 is formed of the same material as the second substrate 72.

A region from one end region toward the other end region of the first substrate 81 is provided, at substantially equal intervals in accordance with the positions at which the discharge head units 11u are aligned, with ink passage ports 812 and sleeves 812s through which the ink flowing back from the respective discharge head units 11u passes, where the other end region of the first substrate 81 is provided with an ink passage port 811 and a sleeve 811s that communicate with the ink derivation port 113 and through which the ink flowing back to the ink derivation port 113 passes. The ink collection flow-path member 80 thus configured allows the ink flowing back from the respective discharge head units 11u to be collected into the ink derivation port 113.

Note that the ink branch flow-path member 70 and the ink collection flow-path member 80 are described as practical examples of the liquid flow-path member of the present application, however, the liquid flow-path member that constitutes the ink circulation path 63 are not limited to these flow-path members. It is sufficient for the liquid flow-path member of the present application to be a liquid flow-path member where the first member formed of the material that blocks ultraviolet light and absorbs laser light and the second member formed of the material that blocks ultraviolet light and transmits laser light and visible light are layered together with a flow-path formed in between.

Figure 7:
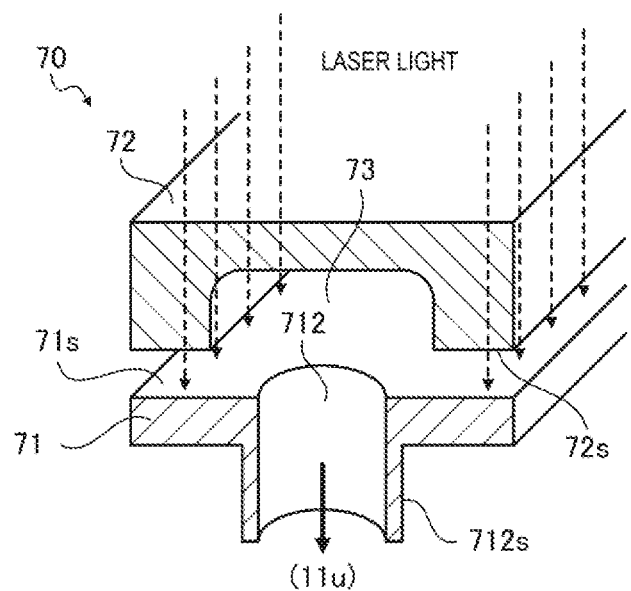
FIG. 7 is a cross-sectional view illustrating another configuration example of an ink branch flow-path member.

In addition, the flow path 73 and the flow path 83 are described as being formed such that the groove formed at the first substrate 71 or the first substrate 81 as the first member is covered by the second substrate 72 or the second substrate 82 as the second members, however, the flow path 73 and the flow path 83 may be formed such that the groove for constituting the flow path 73 or the flow path 83 is formed at the second substrate 72 or the second substrate 82 as the second member, and the groove is covered by the first substrate 71 or the first substrate 81 as the first member. FIG. 7 illustrates, in the ink branch flow-path member 70, an example in which the groove is formed at the second substrate 72.

Next, a manufacturing method for the ink branch flow-path member 70 as the liquid flow-path member according to the embodiment will be described with reference to FIG. 8. Note that a manufacturing method for the ink collection flow-path member 80 is also the same as this.

The manufacturing method of the embodiment includes a welding step for welding the first substrate 71 and the second substrate 72 together. In addition, in the welding step, laser light passing through the second substrate 72 is used to melt a joint surface for joining the second substrate 72 and the first substrate 71 to each other, to weld the first substrate 71 and the second substrate 72 together. Details will be described below.

Figure 8:
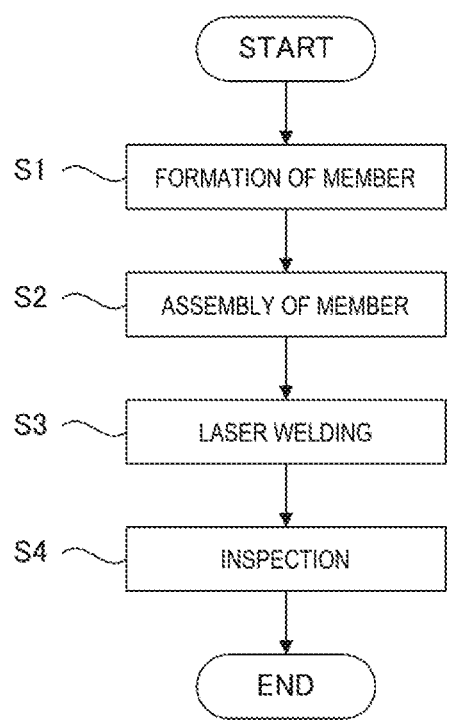
FIG. 8 is a flow chart of a manufacturing process for an ink branch flow-path member as a liquid flow-path member.

First, in step S1 of a flowchart illustrated in FIG. 8, the members that constitute the ink branch flow-path member 70, that are, the first substrate 71 and the second substrate 72 are formed.

Specifically, the first substrate 71 is formed of the material that blocks ultraviolet light and absorbs laser light, and the second substrate 72 is formed of the material that blocks ultraviolet light and transmits laser light and visible light.

Next, in step S2, the first substrate 71 and the second substrate 72 thus formed are assembled.

Specifically, as illustrated in FIG. 4, the first substrate 71 and the second substrate 72 are layered together to be assembled such that the flow path 73 is configured in between.

Next, in step S3, the first substrate 71 and the second substrate 72 are welded together, as the welding step.

Specifically, as illustrated in FIG. 4, a joint surface 71s for joining the second substrate 72 and the first substrate 71 to each other is melted by laser light passing through the second substrate 72, to thus weld the joint surface 71s of the first substrate 71 and a joint surface 72s of the second substrate 72 together.

Note that an Nd:YAG laser having a center wavelength from 800 to 1100 nm is used as the laser light, as a preferred example.

Next, in step S4, a welding state where the first substrate 71 and the second substrate 72 are welded together is inspected.

Specifically, the state of the joint surface between the first substrate 71 and the second substrate 72 that is viewable through the second substrate 72 is subjected to a visual inspection. Note that the inspection may be performed with an appearance inspection apparatus or the like equipped with an image-capturing device and an image processing device, rather than the visual inspection.

Note that the second substrate 72 is formed of the material that blocks ultraviolet light and transmits laser light and visible light to enable the visual inspection in step S4, however, the visual inspection can be abbreviated when the quality of the welding step is stable. In this case, the second substrate 72 does not necessarily need to be formed of a material that transmits visible light, and it is sufficient for the second substrate 72 to be formed of the material that blocks ultraviolet light and transmits laser light.

According to the embodiment, the following advantageous effects can be achieved. Note that the advantageous effects are the same between the ink branch flow-path member 70 and the ink collection flow-path member 80, and thus the advantageous effects will be specifically described, targeting the ink branch flow-path member 70.

According to the ink branch flow-path member 70 as the liquid flow-path member of the present application, the ink branch flow-path member 70 includes the first substrate 71 and the second substrate 72 layered on the first substrate 71 to form a flow path between the first substrate 71 and the second substrate 72, where the first substrate 71 is formed of the material that blocks ultraviolet light and absorbs laser light, and the second substrate 72 is formed of the material that blocks ultraviolet light and transmits laser light and visible light. Accordingly, in the manufacturing process, laser light passing through the second substrate 72 can be used to melt the first substrate 71 and the second substrate 72 together. Thus, the ink branch flow-path member 70 can be provided as a liquid flow-path member having the second substrate 72 with a greater thickness and having high robustness, compared to when the second substrate 72 is welded to the first substrate 71 by thermocompression bonding, for example.

In addition, the first substrate 71 and the second substrate 72, which are formed of a member that blocks ultraviolet light, allow an ultraviolet light-curing type liquid to flow through the ink branch flow-path member 70. That is, according to the ink branch flow-path member 70, the inkjet printer 1 can be configured as a printing apparatus using ultraviolet light-curing type ink.

Further, the second substrate 72, which is formed of a material that transmits visible light, allows the state of the joint surface between the first substrate 71 and the second substrate 72 to be confirmed through the second substrate 72.

Further, the robustness of the liquid flow-path member can be enhanced by using polyimide, which is a material having a high mechanical strength, like the polyimide film 72W2 at the second substrate 72W, compared to when using other resin films.

Moreover, a technologically existing polyimide can be used as the polyimide film 72W2, thus, the manufacturing process can be more easily configured.

According to the manufacturing method for the liquid flow-path member of the present application, the laser light passing through the second substrate 72 can be used to melt the first substrate 71 and the second substrate 72 together. Accordingly, the second substrate 72 can be made thicker in thickness to configure a flow path having high robustness, compared to when welding the second substrate 72 to the first substrate 71 by thermocompression bonding, for example.

In addition, the first substrate 71 and the second substrate 72, which are formed of a member that blocks ultraviolet light, enable to configure a liquid flow-path member for flowing the ultraviolet light-curing type liquid.

Further, the second substrate 72, when formed of a material that transmits visible light, allows the state of the joint surface between the first substrate 71 and the second substrate 72 to be confirmed through the second substrate 72. This makes it possible to easily inspect the joining quality between the first substrate 71 and the second substrate 72.

What is claimed is:

1. A manufacturing method for a liquid flow-path member including a flow path between a first member and a second member that are layered together, the method comprising:
    a welding step for welding the first member and the second member together, wherein
    the first member is formed of a material that blocks ultraviolet light and absorbs laser light,
    the second member is formed of a material that blocks ultraviolet light and transmits laser light, and
    the welding step includes melting, with laser light passing through the second member, a joint surface where the first member and the second member are joined to weld the first member and the second member together.

2. The manufacturing method for the liquid flow-path member according to claim 1, wherein
    the second member is formed of a material that blocks ultraviolet light and transmits laser light and visible light.

* * * * *